United States Patent Office 3,268,396
Patented August 23, 1966

3,268,396
INSECTICIDAL COMPOSITIONS CONTAINING CYCLOPROPANE CARBOXYLIC ACID ESTERS
Saichiro Kuramoto, Toyonaka-shi, Takeaki Kato, Kenzo Ueda, and Yositosi Okuno, Nishinomiya-shi, and Keimei Fujimoto, Minoo-shi, Japan, assignors to Sumitomo Chemical Company, Ltd., Higashi-ku, Osaka, Japan, a corporation of Japan
No Drawing. Filed July 30, 1963, Ser. No. 298,589
Claims priority, application Japan, Aug. 6, 1962, 37/33,598, 37/33,599; Oct. 8, 1962, 37/44,473, 37/44,474
6 Claims. (Cl. 167—33)

This invention relates to insecticidal compositions containing novel cyclopropanecarboxylic acid esters. More particularly, it relates to novel cyclopropanecarboxylic acid esters having the general formula,

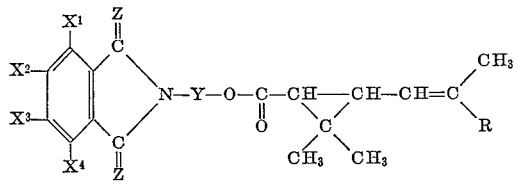

wherein $X^1$, $X^2$, $X^3$, and $X^4$ each means a member selected from the group consisting of hydrogen and halogen atoms, methyl, nitro, methoxy, and cyano radicals; Z is a member of oxygen and sulfur atoms; Y is a member of the group consisting of a direct linkage and alkylene residue having carbon number of 1 to 3; and R is a member selected from methyl and methoxycarbonyl radicals; to a process for preparing the same; and to insecticidal compositions containing the same.

It is one object of the invention to provide a novel group of cyclopropanecarboxylic acid esters, particularly of chrysanthemum carboxylic acid esters, which have strong insecticidal activities to house and agricultural insects with low toxicities to warm-blooded animals and plants, and which can be commercially produced in low cost. Still another object is to provide insecticidal composition containing such an ester. Other objects would be obvious from the following description.

As an insecticide utilizable with safety because of the harmlessness to warm-blooded animals, pyrethrum extract has long been employed. Recently, allethrin which is an analog of the effective ingredients in pyrethrum extract, i.e. pyrethrin and cinerin, was synthesized and developed for insectical uses. These ingredients are surely valuable in their high insecticidal powers, especially in their rapid effect to insects, and in the characteristics of permitting no, or little, resistivity to insects. However, their uses are limited to some extent because of their complicated steps of the production and their great expense for the production.

The present inventors have made broad researches on the various cyclopropanecarboxylic acid esters, and have now found the present novel group of cyclopropanecarboxylic acid esters, which possess significant insecticidal power but are harmless to warm-blooded animals, and which can be prepared from easily available materials by a simple process with low prices. In other words, the present compounds are (thio)phthalimido(alkyl) esters of chrysanthemum carboxylic acids. Accordingly, it is a feature of the present invention that the characteristics of the present compounds resemble pyrethrin, cinerin and allethrin, even though the alcohol moieties of the former are extremely simple as compared to those of the latter and are composed of carbon, hydrogen, oxygen and nitrogen atoms, unlike the latter composed of carbon, hydrogen and oxygen.

Thus, the present invention is to provide novel cyclopropanecarboxylic acid esters having the formula,

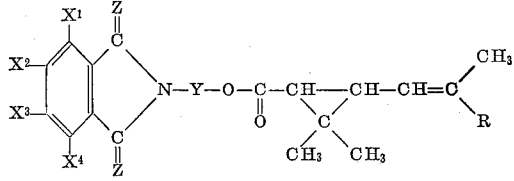

wherein $X^1$, $X^2$, $X^3$, $X^4$, Z, Y and R have the same meanings as identified above, and to provide a process for preparing such compounds, comprising esterifying a phthalimide compound having the general formula,

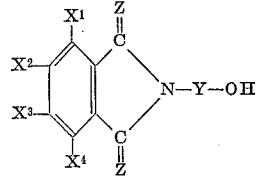

wherein $X^1$, $X^2$, $X^3$, $X^4$, Z and Y have the same meaning as identified above, with a cyclopropanecarboxylic acid having the general formula,

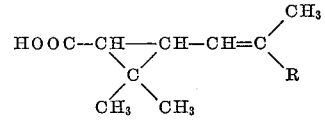

wherein R has the same meaning as identified above, according to the general esterifying procedure.

The phthalimide compound employed in the present invention may be prepared from phthalic acid, phthalic anhydride, phthalimide, and their nucleus-substituted compounds according to the conventional procedures well-known to those skilled in the art.

The cyclopropanecarboxylic acid employed in the present invention is either chrystanthemum monocarboxylic acid (R being $CH_3$) or pyrethric acid (R being $COOCH_3$, a monomethyl ester of chrysanthemum dicarboxylic acid). They are the acidic moieties of pyrethrin, cinerin and allethrin, and can be synthesized according to the known method.

The esterification reaction of the present invention may be effected in various ways. The phthalimide compound may be heated with the cyclopropanecarboxylic acid in the presence of a strong acid, such as aromatic sulfonic acid and sulfuric acid, in an organic solvent capable of azeotropically boiling with water, thereby to remove the water formed in the esterification, out of the reaction system. It may also be heated with a lower alkyl ester of the cyclopropanecarboxylic acid in the presence of a basic catalyst, such as sodium and potassium, thereby to continuously remove the lower alcohol formed through the ester-exchanging reaction out of the reaction system. In such case, methyl, ethyl, n-propyl and isopropyl ester are suitable. In the most preferable esterification, it may be treated with the cyclopropanecarboxylic acid halide in an inert organic solvent, preferably in the presence of a de-hydrogen halide agent, whereby the esterification is proceeded with the isolation of a hydrohalic acid salt within a short period of time. In this case, the acid chloride is the most preferable, though the bromide and the iodide may be employable. Further, it may be refluxed with the cyclopropanecarboxylic acid anhydride in an inert solvent for several hours, thereby to yield the objective ester and free cyclopropanecarboxylic acid, the latter being recovered and again converted to the anhydride by treatment with, for example, acetic anhydride for reuse. Alternatively the phthalimide compound may be employed for the esterification in the form of the halide having the general formula,

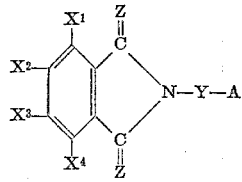

wherein $X^1$, $X^2$, $X^3$, $X^4$, Z and Y have the same meanings as identified above, and A means a halogen atom. In this case, the halide may be heated with an alkali metal salt of the cyclopropanecarboxylic acid in an inert solvent, thereby to yield the objective ester with the isolation of an alkali metal halide salt. In the formula, A may be any of chlorine, bromine, and iodine, among which the former two are preferable and practical. As the alkali metals, sodium and potassium are preferable.

As well-known, the cyclopropanecarboxylic acid as identified above comprises various stereoisomers and optical isomers. It is needless to say that the acid and the derivatives thereof as described herein involve their isomers.

The process of the invention is described in more detail with reference to the following examples, which are however to be construed for the purpose of illustration and not of the limitation.

Example 1

To a mixture of 17.7 g. (0.1 mole) of N-hydroxymethylphthalimide, 18 g. of chrysanthemum monocarboxylic acid and 100 ml. of dry benzene, is added 1 g. of p-toluenesulfonic acid. The mixture is refluxed to remove the resulting water azeotropically. When the theoretical amount of water for the esterification is distilled off, the mixture is cooled and washed with an aqueous saturated sodium bicarbonate solution to remove the acidic substance, and then with an aqueous saturated sodium chloride solution. The mixture is then distilled to remove the solvent. The residue is solidified, which is recrystallized from ligroin, thereby to yield phthalimidomethyl ester of chrystanthemum monocarboxylic acid, colorless scales, having M.P. 110–113° C., in yield of 26.2 g. (80%).

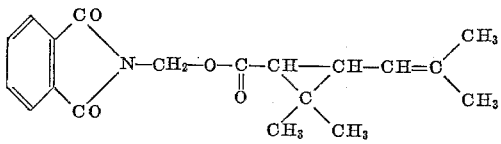

*Analysis.*—Found: C, 69.72; H, 6.50; N, 4.24%. Calculated (for $C_{19}H_{21}NO_4$): C, 69.70; H, 6.47; N, 4.28%.

Example 2

A mixture of 17.7 g. (0.1 mole) of N-hydroxy-methylphthalimide and 19.6 g. of ethyl chrysanthemum monocarboxylate is heated at about 150° C., and 0.3 g. of sodium is added to the heated mixture, whereby ethyl alcohol starts to be distilled out. When the distilling is completed, 0.3 g. of sodium is added again thereto. The addition is repeated 7 times in total, whereby the theoretical amount of ethyl alcohol for the esterification is distilled off. The mixture is then cooled, mixed with ethyl ether, washed with 5% hydrochloric acid, with an aqueous saturated sodium bicarbonate solution and then with a saturated sodium chloride solution, and dried over anhydrous sodium sulfate. Removal of the solvent from the mixture leaves 19.6 g. (60%) of phthalimidomethyl ester of chrysanthemum monocarboxylic acid.

Example 3

A mixture of 17.7 g. (0.1 mole) of N-hydroxymethylphthalimide, 50 ml. of dry toluene and 50 g. of pyridine, is cooled with ice, and a solution of 19 g. (1.02 moles) of chrysanthemum monocarboxylic acid chloride dissolved in 50 ml. of toluene is added to the mixture. Upon the addition, pyridinium hydrochloride salt is isolated. After stirring at room temperature for 7 hours, the mixture is filtered, and the filtrate is washed with a dilute hydrochloric acid solution to remove excess of pyridine, then washed with a aqueous 5% sodium carbonate solution and with an aqueous saturated sodium chloride, subsequently. Upon distillation of toluene from the mixture in vacuo, crystals of phthalimidomethyl ester of chrysanthemum monocarboxylic acid is obtained, which has M.P. 110–113° C. after a recrystallization from toluene. The yield is 27.8 g. (85%).

Example 4

A mixture of 17.7 g. (0.1 mole) of N-hydroxymethylphthalimide, 32 g. of chrysanthemum monocarboxylic acid anhydride and 60 g. of dry xylene, is refluxed for 3 hours. The mixture is then cooled and washed with an aqueous 3% sodium hydroxide solution at a temperature below 20° C., thereby to remove the by-produced chrysanthemum monocarboxylic acid. The mixture is further washed with a saturated sodium chloride solution to remove alkaline substance, and then evaporated to remove xylene. Crystals of phthalimidomethyl ester of chrysanthemum monocarboxylic acid is obtained in 26.8 g. (81%) yield, which have M.P. 108–112° C.

Example 5

A dispersion of 19 g. (0.1 mole) of sodium chrysanthemum monocarboxylate in a naphtha solvent is heated at about 150° C., and 20 g. of N-(chloromethyl)-phthalimide is added thereto over about 30 minutes. Esterification is proceeded with isolation of sodium chloride. Removal of the solvent by distillation in vacuo leaves 21.2 g. (65%) of phthalimidomethyl ester of chrysanthemum monocarboxylic acid.

Example 6

A mixture of 21.2 g. (0.1 mole) of 4-chloro-N-hydroxymethylphthalimide, 60 g. of pyridine and 50 ml. of dry toluene is treated with chrysanthemum monocarboxylic acid chloride as in Example 3, and 34.4 g. (95%) of 4-chlorophthalimidomethyl ester of chrysanthemum monocarboxylic acid is obtained. A recrystallization from ligroin yields colorless needles, M.P. 79–83° C.

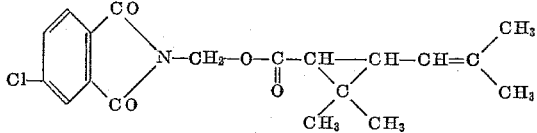

*Analysis.*—Found: C, 62.80; H, 5.79; N, 3.88%. Calculated (for $C_{19}H_{20}NO_4Cl$): C, 62.98; H, 5.52; N, 3.87%.

Example 7

Using 25.6 g. (0.1 mole) of 4-bromo-N-hydroxymethylphthalimide and 19 g. of chrysanthemum monocarboxylic acid chloride, the same procedure as in Example 3 is conducted, and 37.4 g. (92%) of yellow oily 4-bromo-phthalimidomethyl ester of chrysanthemum monocarboxylic acid is obtained.

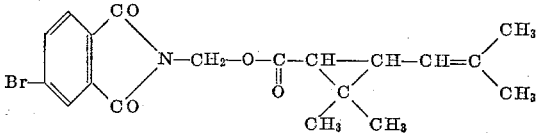

*Analysis.*—Found: C, 56.23; H, 5.03; Br, 19.81%. Calculated (for $C_{19}H_{20}NO_4Br$): C, 56.17; H, 4.96; Br, 19.67%.

Example 8

A mixture of 24.6 g. (0.1 mole) of 3,6-dichloro-N-hydroxymethylphthalimide, 60 g. of pyridine and 50 ml. of dry toluene, is treated with chrysanthemum monocarboxylic acid chloride as in Example 3, and 36.0 g. (91%) of 3,6-dichlorophthalimidomethyl ester of chrysanthemum monocarboxylic acid is obtained. A recrystallization from ligroin yields colorless needles, M.P. 120–127° C.

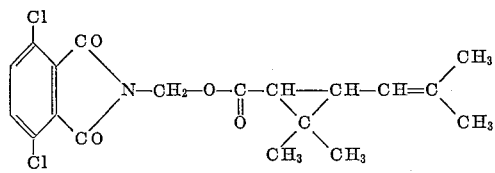

*Analysis.*—Found: C, 56.98; H, 4.75; N, 3.60%. Calculated (for $C_{19}H_{19}Cl_2NO_4$): C, 57.43; H, 4.79; N, 3.53%.

Example 9

Using 31.5 g. (0.1 mole) of 3,4,5,6-tetrachloro-N-hydroxymethylphthalimide and 19 g. of chrysanthemum monocarboxylic acid chloride, the same procedure as in Example 3 is conducted, and 43.3 g. (93%) of 3,4,5,6-tetrachlorophthalimidomethyl ester of chrysanthemum monocarboxylic acid is obtained.

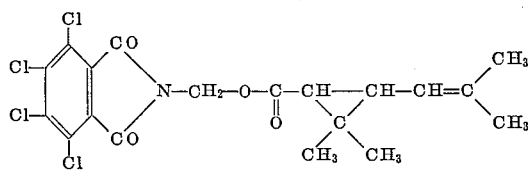

*Analysis.*—Found: C, 49.11; H, 3.59; Cl, 30.66%. Calculated (for $C_{19}H_{17}Cl_4NO_4$): C, 49.06; H, 3.63; Cl, 30.49%.

Example 10

Using 23.2 g. (0.1 mole) of 3-nitro-N-hydroxy-methylphthalimide and 19 g. of chrysanthemum monocarboxylic acid chloride, the same procedure as in Example 3 is conducted, and 32.7 g. (88%) of 3-nitrophthalimidomethyl ester of chrysanthemum monocarboxylic acid is obtained. A recrystallization from a mixed ligroin-toluene solvent yields colorless needles, M.P. 118–120° C.

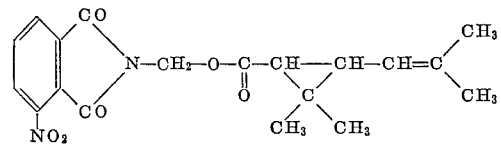

*Analysis.*—Found: C, 61.35; H, 5.22; N, 7.55%. Calculated (for $C_{19}H_{20}N_2O_6$): C, 61.29; H, 5.38; N, 7.53%.

Example 11

Using 23.0 g. (0.1 mole) of 4-nitro-N-hydroxymethylphthalimide and 19 g. of chrysanthemum monocarboxylic acid chloride, the same procedure as in Example 3 is conducted, and 35.0 g. (90%) of 4-nitrophthalimidomethyl ester of chrysanthemum monocarboxylic acid is obtained. A recrystallization from a mixed ligroin-toluene solvent yields colorless needles, M.P. 125–130° C.

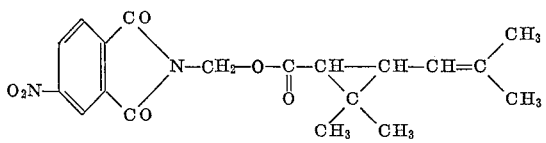

*Analysis.*—Found: C, 61.40; H, 6.06; N, 7.50%. Calculated (for $C_{19}H_{20}N_2O_6$): C, 61.29; H, 5.38; N, 7.53%.

Example 12

Using 30.1 g. (0.1 mole) of 3-bromo-6-nitro-N-hydroxymethylphthalimide and 19 g. of chrysanthemum monocarboxylic acid chloride, the same esterification as in Example 3 is conducted, and 40.6 g. (90.0%) of yellow oily 3-bromo-6-nitrophthalimidomethyl ester of chrysanthemum monocarboxylic acid is obtained.

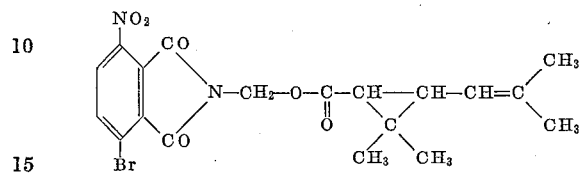

*Analysis.*—Found: C, 50.83; H, 4.44; Br, 17.94%. Calculated (for $C_{19}H_{19}BrN_2O_6$): C, 50.57; H, 4.24; Br, 17.71%.

Example 13

Using 19.1 g. (0.1 mole) of 3-methyl-N-hydroxy-methylphthalimide and 19 g. of chrysanthemum monocarboxylic acid chloride, the same esterification as in Example 3 is conducted, and 32.7 g. (96%) of oily 3-methylphthalimidomethyl ester of chrysanthemum monocarboxylic acid is obtained.

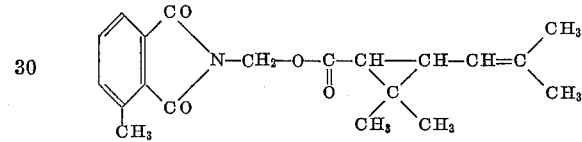

*Analysis.*—Found: C, 70.50; H, 6.69; N, 4.35%. Calculated (for $C_{20}H_{23}NO_4$): C, 70.36; H, 6.79; N, 4.10%.

Example 14

Using 19.1 g. (0.1 mole) of 4-methyl-N-hydroxymethylphthalimide and 19 g. of chrysanthemum monocarboxylic acid chloride, the same esterification as in Example 3 is conducted, and 32.4 g. (95%) of oily 4-methylphthalimidomethyl ester of chrysanthemum monocarboxylic acid is obtained.

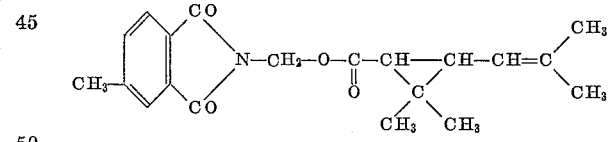

*Analysis.*—Found: C, 70.90; H, 6.58; N, 4.01%. Calculated (for $C_{20}H_{23}NO_4$): C, 70.36; H, 6.79; N, 4.10%.

Example 15

Using 20.7 g. (0.1 mole) of 4-methoxy-N-hydroxymethylphthalimide and 19 g. of chrysanthemum monocarboxylic acid chloride, the same esterification as in Example 3 is conducted, and 33.2 g. (93%) of pale yellow oily 4-methoxyphthalimidomethyl ester of chrysanthemum monocarboxylic acid is obtained.

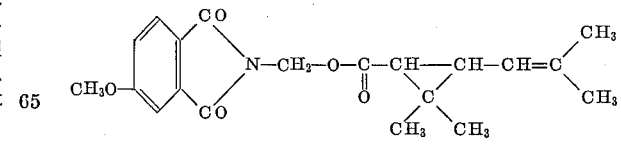

*Analysis.*—Found: C, 68.00; H, 6.52; N, 4.10%. Calculated (for $C_{20}H_{22}NO_5$): C, 67.21; H, 6.49; N, 3.92%.

Example 16

Using 24.2 g. of 3-chloro-4-methoxy-N-hydroxymethylphthalimide and 19 g. of chrysanthemum monocarboxylic acid chloride, the same esterification as in Example 3 is conducted, and 37.6 g. (96%) of pale yellow oily 3- chloro-4-methoxyphthalimidomethyl ester of chrysanthemum monocarboxylic acid is obtained.

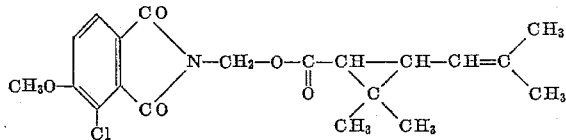

*Analysis.*—Found: C, 61.40; H, 6.02; Cl, 9.01%. Calculated (for $C_{20}H_{22}ClNO_5$): C, 61.30; H, 5.66; Cl, 9.05%.

Example 17

Using 20.2 g. (0.1 mole) of 4-cyano-N-hydroxy-methylphthalimide and 19 g. of chrysanthemum monocarboxylic acid chloride, the same esterification as in Example 3 is conducted, and 33.1 g. (94%) of pale yellow only 4-cyanophthalimidomethyl ester of crysanthemum monocarboxylic acid is obtained.

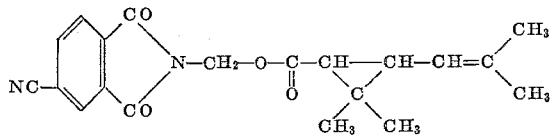

*Analysis.*—Found: C, 68.01; H, 5.48; N, 8.10%. Calculated (for $C_{20}H_{20}N_2O_4$): C, 68.17; H, 5.72; N, 7.95%.

Example 18

Using 17.7 g. (0.1 mole) of N-hydroxymethylphthalimide and 23.5 g. (0.102 mole) of pyrethryl chloride, the same esterification as in Example 3 is conducted, and 33.0 g. (89%) of pale yellow oily phthalimidomethyl ester of pyrethric acid is obtained.

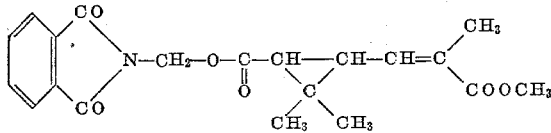

*Analysis.*—Found: C, 64.60; H, 5.73; N, 3.99%. Calculated (for $C_{20}H_{21}NO_6$): C, 64.68; H, 5.70; N, 3.77%.

Example 19

A mixture of 19.1 g. (0.1 mole) of N-(β-hydroxyethyl)phthalimide, 60 g. of pyridine and 50 ml. of toluene, is cooled with ice, and a solution of 19 g. of chrysanthemum monocarboxylic acid chloride in 50 ml. of toluene is added thereto. The mixture is treated as in Example 3, and 30.7 g. (90%) of β-(phthalimido)ethyl ester of chrysanthemum monocarboxylic acid is obtained. A recrystallization from ligroin yields crystals having M.P. 65–68° C.

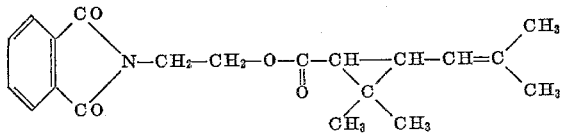

*Analysis.*—Found: C, 70.33; H, 6.87; N, 4.17%. Calculated (for $C_{20}H_{23}NO_4$): C, 70.36; H, 6.79; N, 4.10%.

Example 20

A mixture of 20.5 g. (0.1 mole) of N-(γ-hydroxypropyl)phthalimide, 60 g. of pyridine and 50 ml. of dry toluene, is cooled with ice, and a solution of 19 g. of chrysanthemum monocarboxylic acid chloride in 50 ml. of toluene is added thereto. The mixture is treated as in Example 3, and 32.6 g. (92%) of pale yellow oily γ-(phthalimido)-propyl ester of chrysanthemum monocarboxylic acid is obtained.

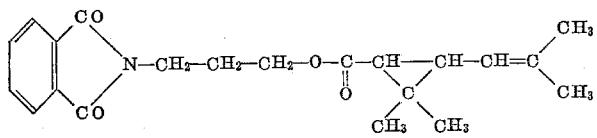

*Analysis.*—Found: C, 70.90; H, 7.18; N, 3.74%. Calculated (for $C_{21}H_{25}NO_4$): C, 70.96; H, 7.09; N, 3.94%.

Example 21

A mixture of 16.3 g. (0.1 mole) of N-hydroxy-phthalimide, 50 g. of pyridine and 40 ml. of dry toluene, is treated with chrysanthemum monocarboxylic acid chloride as in Example 3, and 30.0 g. (96.0%) of phthalimide ester (anhydride) of chrysanthemum monocarboxylic acid is obtained. A recrystallization from ligroin yields colorless needles, M.P. 70–75° C.

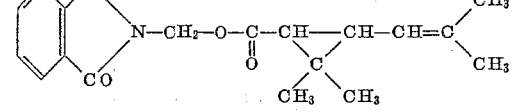

*Analysis.*—Found: C, 69.03; H, 6.25; N, 4.41%. Calculated (for $C_{18}H_{19}NO_4$): C, 68.99; H, 6.11; N, 4.47%.

Example 22

Using 19.3 g. (0.1 mole) of N-hydroxymethylthiophthalimide and 19 g. of chrysanthemum monocarboxylic acid chloride, the same esterification is conducted, and 32.0 g. (93%) of pink crystalline thiophthalimidomethyl ester of chrysanthemum monocarboxylic acid is obtained.

*Analysis.*—Found: C, 66.28; H, 6.09; S, 9.47%. Calculated (for $C_9H_{21}NO_3S$): C, 66.44; H, 6.16; S, 9.34%.

As mentioned above, the present esters possess superior insecticidal power, and exhibit rapid knock down and excellent killing effect to house flies, mosquitos, cockroaches, etc. Moreover, these esters are especially useful for sanitary and domestic purposes, because of their rapid effectiveness and harmlessness (for example, phthalimidomethyl ester of chrysanthemum monocarboxylic acid shows oral toxicity to mice in $LD_{50}$ value of more than 10 g./kg.). The present esters are suitably employed for the preparation of insecticidal compositions which have broad uses, correlatively with the low cost.

For the formulation of the insecticidal composition containing the present compound as the essential ingredient, oil solution, emulsifiable concentrate, wettable powder, dust, aerosol, mosquito coil, bait and other preparation, may be formulated using generally employed carrier, diluents or auxiliary agents, according to the method known to those skilled in the art in the cases of the formulation of pyrethrum extract and allethrin. If the compound is crystalline, it is preferably employed as a preliminarily prepared solution in an organic solvent, such as acetone, xylene, methylnaphthalene, etc., depending upon the type of the formulation.

If desired, the present esters may be employed for the preparation of the insecticidal compositions in combination with other insecticidal component, such as pyrethroide, for example, pyrethrum extract and allethrin, organochlorine and organophosphorus compounds, synergistic agent for pyrethroide, for example, piperonyl butoxide, sulfoxide, and the like. By combination with such other ingredient, the present insecticidal composition can be adapted to broader uses with more increased effect.

Concretely speaking, the present esters may be blended with at least one of pyrethrin, allethrin, O,O-dimethyl O-(3-methyl-4-nitrophenyl) thiophosphate, malathion, diazinone, dimethoate, γ-BHC, and others, to yield a pesticidal composition which possesses high insecticidal activity with rapid effectivity. In such cases, both components may be blended in a broad range of proportions, for example, in ratio of 0.05:1 to 1:0.05 by weight of the ester to another insecticidal component.

The following are the illustrations of the insecticidal compositions containing the cyclopropanecarboxylic acid esters according to the invention and of the insecticidal activities.

*Example 23*

Each 0.4 gram of phthalimidomethyl ester (I), or monothiophthalimidomethyl ester (II), of chrysanthemum monocarboxylic acid was dissolved in 3 ml. of methylnaphthalene and a refined kerosene was added to the solution to make 100 ml., thereby to yield 0.3% oil solution.

In a glass box of 70 cm. cube about 30 house flies (adult) were liberated, and 0.3 ml. of the thus-prepared oil solution was uniformly sprayed with an atomizer into the box. Knock-down number of house flies according to the lapse of time were observed. Similarly, a 0.4% oil solution prepared using allethrin was tested for comparison.

*Knock-down ratio of houseflies according to the lapse of time, percent*

|  | 30 sec. | 42 sec. | 1 min. | 1 min., 25 sec. | 2 min. | 2 min., 50 sec. | 4 min. | 5 min., 40 sec. | 8 min. |
|---|---|---|---|---|---|---|---|---|---|
| The compound (I)[1] | 5.4 | 15.0 | 33.5 | 44.1 | 50.4 | 56.2 | 61.8 | 64.5 | 68.0 |
| The compound (II)[1] | 3.8 | 14.0 | 33.1 | 40.0 | 50.3 | 57.3 | 62.0 | 68.0 | 68.3 |
| Allethrin [1] | 7.8 | 15.7 | 27.2 | 37.9 | 48.4 | 55.8 | 56.3 | 67.1 | 69.2 |

[1] 0.4% oil solution.

On the other hand, by use of the same equipment as above, a test was made by using common mosquitos. The 0.4% oil preparation mentioned above was diluted by a refined kerosene to 0.2%, and 0.3 ml. was sprayed. The results of the test for knock-down ratio of the common mosquitos are as follows.

*Knock-down ratio of common mosquitos according to the lapse of time, percent*

|  | 30 sec. | 42 sec. | 1 min. | 1 min., 25 sec. | 2 min. | 2 min., 50 sec. | 4 min. | 5 min., 40 sec. | 8 min. |
|---|---|---|---|---|---|---|---|---|---|
| The compound (I)[1] | 14.3 | 28.6 | 35.7 | 35.7 | 42.9 | 42.9 | 45.7 | 50.0 | 57.1 |
| The compound (II)[1] | 13.1 | 25.3 | 34.8 | 37.2 | 44.0 | 45.3 | 49.5 | 58.8 | 63.2 |
| Allethrin [1] | 9.1 | 13.6 | 13.6 | 22.8 | 27.3 | 40.9 | 50.9 | 63.6 | 68.2 |

[1] 0.2% oil.

*Example 24*

One gram of 4-chlorophthalimidomethyl ester (III) of chrysanthemum monocarboxylic acid or 3,6-dichlorophthalimidomethyl ester (IV) of chrysanthemum monocarboxylic acid was dissolved in 3 ml. of xylene and kerosene was added to the solution to make 100 ml., thereby to yield 1% oil solution.

The 1% oil solution was diluted with kerosene to make solutions of various concentrations. The resulting solutions were sprayed to houseflies by means of Campbell's turn-table and the mortality after 24 hours was examined. Following are the results of the experiments:

| Concentration, (Percent) | Mortality (Percent) | |
|---|---|---|
|  | Oil solution of (III) | Oil solution of (IV) |
| 1 | 95.8 | 98.0 |
| 0.5 | 81.5 | 87.6 |
| 0.25 | 52.4 | 65.2 |
| 0.125 | 27.3 | 33.0 |

*Example 25*

85 g. of xylene and 5 g. of Sorpol 2379 (a mixture of polyoxyethylene alkyl phenyl ether and alkyl aryl calcium sulfonate) were mixed with 10 g. of 4-methylphthalimidomethyl ester (V) or 3-chloro-4-methoxyphthalimidomethyl ester (VI) of chrysanthemum monocarboxylic acid. Thus, a homogenous emulsifiable concentrate was obtained.

10 ml. of a solution obtained by dilution of the resulting 10% emulsifiable concentrate was sprayed onto houseflies (adult) in a settling-tower. After 5 seconds, the shutter was opened and the houseflies were exposed to the sprayed air for 10 minutes and were then taken out from the settling-tower. The houseflies were kept in a room at a constant temperature of 28° C. and the mortality was examined after 20 hours.

Following are the results of the mortality of the houseflies.

| Concentration, (Percent) | Mortality (Percent) | |
|---|---|---|
|  | Emulsion of (V) | Emulsion of (VI) |
| 1.0 | 97.4 | 90.7 |
| 0.5 | 80.8 | 70.5 |
| 0.25 | 51.0 | 38.8 |
| Control | 1.2 | 2.0 |

*Example 26*

0.3 g. of phthalimidomethyl ester (VII) of chrysanthemum dicarboxylic acid was dissolved in 3 ml. of methylnaphthalene and, to this solution, a refined kerosene was added to make the total volume 100 ml. Thus 0.3% oil solution was obtained.

In the same way as in Example 23, knock-down number of houseflies were examined. The results of the test were as follows:

*Knock-down ratio of houseflies according to the lapse of time, percent*

|  | 30 sec. | 42 sec. | 1 min. | 1 min., 25 sec. | 2 min. | 2 min., 50 sec. | 4 min. | 5 min., 30 sec. | 8 min. |
|---|---|---|---|---|---|---|---|---|---|
| The compound (VII) [1] | 1.8 | 8.7 | 17.1 | 26.5 | 32.4 | 41.3 | 50.1 | 51.8 | 55.4 |
| Allethrin [1] | 0 | 2.6 | 9.0 | 14.2 | 27.9 | 44.3 | 54.3 | 63.5 | 78.9 |

[1] 0.3% oil.

Example 27

Two grams of phthaliminomethyl ester of chrysanthemum monocarboxylic acid is dissolved in 10 ml. of acetone, and the solution is mixed with 98 g. of 300 mesh (Taylor) talc. The mixture is well blended by a mixer, and the acetone is allowed to evaporate. Thus, a dust preparation containing 2% of the active ingredient is obtained.

Into a settling-tower attached with a cage in which about 30 houseflies (adult) are liberated, 100 mg. or 500 mg. of the dust preparation is scattered, and the houseflies are allowed to be exposed to the preparation as in Example 25. After 20 hours, the mortalities are observed.

| Mg. | Mortality, percent |
|---|---|
| 1000 | 100.0 |
| 500 | 78.3 |
| Control | 2.5 |

What we claim is:

1. A composition comprising a carrier and as the essential ingredient an insecticidal amount of a cyclopropanecarboxylic acid ester having the formula,

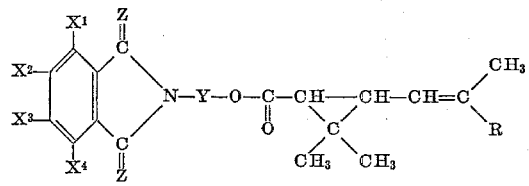

wherein $X^1$, $X^2$, $X^3$, and $X^4$ each means a member selected from the group consisting of hydrogen and halogen, methyl, nitro, methoxy, and cyano; Z is a member selected from the group consisting of oxygen and sulfur; Y is a member selected from the group consisting of a direct linkage and alkylene having carbon numbers of 1 to 3; and R is a member selected from the group consisting of methyl and methoxycarbonyl.

2. A composition comprising at least one hydrocarbon selected from the group consisting of methylnaphthalene, kerosene and xylene and as the essential ingredient an insecticidal amount of a cyclopropanecarboxylic acid ester having the formula,

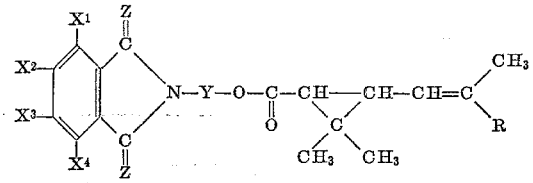

wherein $X^1$, $X^2$, $X^3$, and $X^4$ each means a member selected from the group consisting of hydrogen and halogen, methyl, nitro, methoxy, and cyano; Z is a member selected from the group consisting of oxygen and sulfur; Y is a member selected from the group consisting of a direct linkage and alkylene having carbon numbers of 1 to 3; and R is a member selected from the group consisting of methyl and methoxycarbonyl.

3. A composition comprising an emulsifier and as the essential ingredient an insecticidal amount of a cyclopropanecarboxylic acid ester having the formula,

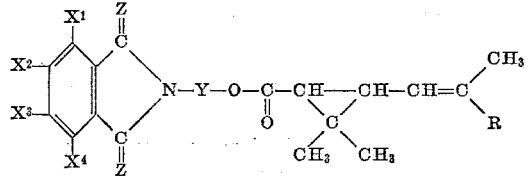

wherein $X^1$, $X^2$, $X^3$, and $X^4$ each means a member selected from the group consisting of hydrogen and halogen, methyl, nitro, methoxy, and cyano; Z is a member selected from the group consisting of oxygen and sulfur; Y is a member selected from the group consisting of a direct linkage and alkylene having carbon numbers of 1 to 3; and R is a member selected from the group consisting of methyl and methoxycarbonyl.

4. A composition comprising a powdered solid carrier and as the essential ingredient an insecticidal amount of a cyclopropanecarboxylic acid ester having the formula,

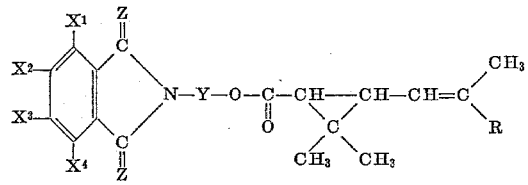

wherein $X^1$, $X^2$, $X^3$, and $X^4$ each means a member selected from the group consisting of hydrogen and halogen, methyl, nitro, methoxy, and cyano; Z is a member selected from the group consisting of oxygen and sulfur; Y is a member selected from the group consisting of a direct linkage and alkylene having carbon numbers of 1 to 3; and R is a member selected from the group consisting of methyl and methoxycarbonyl.

5. A composition comprising a carrier and as an essential ingredient an insecticidal amount of a cyclopropanecarboxylic acid ester having the formula,

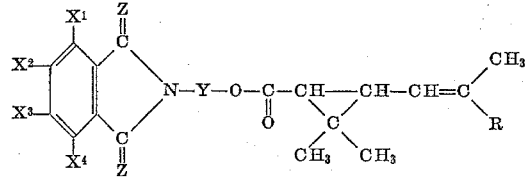

wherein $X^1$, $X^2$, $X^3$, and $X^4$ each means a member selected from the group consisting of hydrogen and halogen, methyl, nitro, methoxy, and cyano; Z is a member selected from the group consisting of oxygen and sulfur; Y is a member selected from the group consisting of a direct linkage and alkylene having carbon numbers of 1 to 3; and R is a member selected from the group consisting of methyl and methoxycarbonyl, and, as another ingredient, O,O-dimethyl-O-(3-methyl-4-nitrophenyl) thiophosphate, in ratio of 0.05:1 to 1:0.05 by weight of the ester to O,O-dimethyl-O-(3-methyl-4-nitrophenyl) thiophosphate.

6. A method of killing insects which comprises contacting the insects with an insecticidal quantity of a cyclopropanecarboxylic acid ester having the formula,

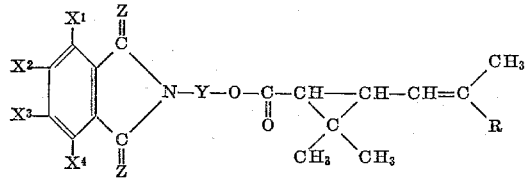

wherein $X_1$, $X_2$, $X_3$, and $X_4$ each means a member selected from the group consisting of hydrogen and halogen, methyl, nitro, methoxy, and cyano; Z is a member selected from the group consisting of oxygen and sulfur; Y is a member selected from the group consisting of a direct linkage and alkylene having carbon numbers of 1 to 3; and R is a member selected from the group consisting of methyl and methoxycarbonyl.

References Cited by the Examiner

UNITED STATES PATENTS

| 2,863,801 | 12/1958 | Kuhle et al. | 167—33 |
| 2,884,355 | 4/1959 | Goodhue et al. | 167—33 |
| 3,060,191 | 10/1962 | Kolb et al. | 260—326 |
| 3,064,006 | 11/1962 | Novello | 260—326 |

JULIAN S. LEVITT, *Primary Examiner.*

VERA C. CLARKE, D. B. MOYER,
*Assistant Examiners.*